United States Patent [19]
Kimmel et al.

[11] Patent Number: 5,713,004
[45] Date of Patent: Jan. 27, 1998

[54] CACHE CONTROL FOR USE IN A MULTIPROCESSOR TO PREVENT DATA FROM PING-PONGING BETWEEN CACHES

[75] Inventors: Jeffrey S. Kimmel, Chapel Hill, N.C.; Elizabeth H. Reeves, Westboro; Peter B. Everdell, Littleton, both of Mass.

[73] Assignee: Data General Corporation, Westboro, Mass.

[21] Appl. No.: 443,604

[22] Filed: May 18, 1995

[51] Int. Cl.$^6$ .................................................. G06F 12/08
[52] U.S. Cl. .......................... 395/472; 395/451; 395/448
[58] Field of Search ............................ 295/448, 451, 295/457, 471, 472, 468

[56] References Cited

U.S. PATENT DOCUMENTS 5,317,716   5/1994   Liu ........................................... 395/471

Primary Examiner—Eddie P. Chan
Assistant Examiner—Kevin L. Ellis
Attorney, Agent, or Firm—Donald A. Lewine; Robert L. Dulaney

[57] ABSTRACT

A multiprocessor cache control uses ping-pong bits to reduces the number of invalidate cycles on a shared system bus in a multiprocessor system with a plurality of caches when data is being updated by multiple CPUs. The ping-pong bit is used predict when sharing is taking place and convert read-shared requests into read-exclusive requests.

20 Claims, 5 Drawing Sheets

Table 1: Cache State Transitions

| Current State | Event | New State |
|---|---|---|
| Invalid | Write Miss | Data is stored in cache and new state is Exclusive-Modified |
| | Shared Read Miss | Data is read from main memory or shared cache and new state is Shared-Unmodified |
| | Exclusive Read Miss | Data is read from main memory or shared cache and new state is Exclusive-Unmodified |
| Shared-Unmodified | Exclusive Read Miss | Exclusive-Unmodified |
| | Invalidate Command | Invalid |
| | Snoop Hit, Read with Intent-to-modify | Invalid |
| Exclusive-Modified | Exclusive Read Miss | Old data is written to memory and new data is read from main memory or shared cache and new state is Exclusive-Unmodified |
| | Shared Read Miss | Old data is written to memory and new data is read from main memory or shared cache and new state is Shared-Unmodified |
| | Snoop Hit, Read with Intent-to-modify | Old data is written to memory and new state is Invalid |
| Exclusive-Unmodified | Shared Read Miss | Data is read from main memory or shared cache and new state is Shared-Unmodified |
| | Write Hit | Exclusive-Modified |
| | Snoop Hit, Read with Intent-to-modify | Invalid |

Figure 2

CACHE CONTROL FOR USE IN A MULTIPROCESSOR TO PREVENT DATA FROM PING-PONGING BETWEEN CACHES

CROSS REFERENCE TO RELATED APPLICATIONS

There are no related applications.

BACKGROUND—FIELD OF INVENTION

This invention is in the field of data processing. It is directed to the sharing of a large main memory among a plurality of microprocessors using a hierarchy of private and shared caches.

BACKGROUND—DESCRIPTION OF PRIOR ART

Most high performance microprocessors have a private on-chip cache. This cache holds recently used locations from main memory. There also may be second or third level caches. All cache memories are designed to reduce the average memory access time.

In a multiprocessor system these caches may contain multiple copies of information from main memory. For a good description of the various design alternatives see "Cache and Memory Hierarchy Design" by Steven A. Przybylski and published by Morgan Kaufman. Also see "Computer Architecture: A Quantitative Approach" by John L. Hennessy and David A. Patterson also published by Morgan Kaufman. In particular, pages 403-425 on Memory-Hierarchy design and pages 467 to 474 on Multiprocessor Cache Coherency.

A typical prior art multiprocessor system is shown in FIG. 1. There are four CPUs: CPU A 101,CPU B 102,CPU C 103, and CPU D 104, each CPU has a private cache, 111 to 114 respectively. CPU A 101 and CPU B 102 share local bus 1 121 and shared cache 1 131. CPU C 103 and CPU D 104 share local bus 2 122 and shared cache 2 132. In a typical system, CPU A 101, CPU B 102, private cache A 111, private cache B 112, local bus 121 and shared cache 1 131 are all mounted on a single printed circuit board. That board plugs into a backplane system bus 140. CPU C 103, CPU D 104 and their associated busses and caches are on an identical printed circuit board also plugged into system bus 140. Main Memory 150 is comprised of additional printed circuit boards that plug into the system bus 140.

At any point in time there may be multiple copies of a given data item from main memory 150 stored in the plurality of private and shared caches shown in FIG. 1. All of these copies must be kept consistent. An example of a cache coherency protocol used for private caches is described in "Motorola MC88110 Second Generation Microprocessor User's Manual" on pages 11-18 through 11-32. Each cache line in caches 111-114 will be in one of 4 possible states: Invalid, Shared-Unmodified, Exclusive-Unmodified, or Exclusive-Modified.

Invalid indicates that this line is no longer the most recent copy of the data and should not be used.

Shared-Unmodified indicates that this line is shared among processors, so other caches may have a copy of this data. However, this line is unmodified with respect to main memory.

Exclusive-Modified indicates that only one private cache has a copy of the data and the data has been modified with respect to main memory.

Exclusive-Unmodified indicates that only one private cache has a copy of the data and the data is unmodified with respect to main memory.

In a typical prior art system to keep the caches coherent, each private cache monitors (or snoops) its local bus to detect actions which may affect the state of the data in the private cache. The various state transitions are shown in FIG. 2.

An example of a Bus Snooping Protocol is described in "MC88410 Secondary Cache Controller User's Manual" on pages 2-41 through 2-72. This protocol is well known in the art and called the MESI protocol.

One of the prior art problems in a system with multiple caches is data ping-ponging from one board to another. If, for example, CPU A 101 and CPU D 104 are both actively updating the same location in main memory 150, the cache line associated with that memory location would undergo many transitions between the Invalid, Shared-Unmodified and Exclusive-Modified states. These transitions would result in a great deal of traffic on system bus 140.

U.S. Pat. No. 4,445,174 discloses a shared cache that adds a shared cache in parallel with the private caches. That approach does not work for commodity microprocessors where the cache architecture is determined by the chip vendor. U.S. Pat. No. 4,484,267 teaches turning a write-back cache (called a store-in-cache SIC in that patent) into a write-through cache (called a store-through ST cache in that patent). In the configuration addressed by the current invention the shared caches are always write-through so the teaching of U.S. Pat. No. 4,484,267 does not apply.

There were two papers presented at the 20th Annual International Symposium on Computer Architecture in San Diego, Calif. and published in the May 1993 issue of Computer Architecture News which relate to the present invention.

The first paper, "Adaptive Cache Coherency for Detecting Migratory Shared Data" by Alan L. Cox and Robert J. Fowler describe modifications to the common MESI protocol to reduce the number of invalidate messages. They add additional states, such as, Migratory-Clean and Migratory-Dirty to the protocol. The present invention works with standard microprocessors using the common MESI protocol. Commercial microprocessors, such as the Intel Pentium® or the Motorola 88110 are produced in huge volumes and it is very desirable to use the common MESI protocol exactly as implemented in those chips.

The second paper, "An Adaptive Cache Coherence Protocol Optimized for Migratory Sharing" by Per Stenstr öom, Mats Brorsson, and Lars Sandberg describes a different set of modifications to the common MESI protocol. As with the first paper, it is very desirable to use the common MESI protocol as implemented by chip vendors. The protocol presented in this paper also has another major limitation, "There is an explicit notion of the home of the coherence state. The detection mechanism relies on the fact that all global read and write requests must interrogate the home directory." Our invention does not have a home directory.

OBJECTS AND ADVANTAGES

The objective of the present invention is to reduce bus traffic on the main system bus by predicting when sharing will occur and eliminating extra invalidate cycles that would otherwise occur when two caches pass data back and forth.

It is another objective of the present invention to use ordinary microprocessors produced in high volume and at low cost by vendors, such as Intel and Motorola, without making any modifications to the cache coherency protocols built into those chips.

BRIEF DESCRIPTION OF THE DRAWINGS

FIG. 2 Cache state transitions used by the cache coherency protocol of the 88110.

SUMMARY

The nature of the present invention is to predict when write sharing is occurring in a multi-processor system having a plurality of caches. Write sharing is when a modified data line is being passed back and forth between two or more system boards. When a data line is passed from processor to processor by read operations the line is marked as shared and both processor have a copy of the line in their private caches. Whenever a processor that has a shared copy of the of the data line wants to write the data line the writing processor must tell the other processors that have a copy of the line to invalidate the line. This requires an additional operation on the system and local busses.

The present invention predicts when this type of sharing is occurring. When correctly predicted the extra cache invalidate is eliminated by allowing the receiving CPU to have exclusive control over the data line and invalidating the copy in the sending CPU. By allowing the receiving CPU to have the data line exclusively the receiving CPU can write to the data line any time it wants without having to perform an invalidate operation. By reducing traffic on the busses, the performance of the system increases, particularly when a lot of write sharing is occurring such as in data base or transaction processing applications.

PREFERRED EMBODIMENT

The current invention is related to the reduction of bus traffic in a multiprocessor system. In particular, it relates to the reduction in the number of invalidate messages on a shared system bus. The description of the preferred embodiment shows how to use the invention with Motorola 88110 microprocessors and a configuration used in Data General AViiON™ AV/9500 computer system. These choices are used merely to illustrate how to practice the current invention in its best mode and should not be considered as limits on the scope of this patent. An engineer of ordinary skill could adapt the invention disclosed here to work with, for example, an IBM PowerPC™ or an Intel Pentium® CPU.

Figure 1:
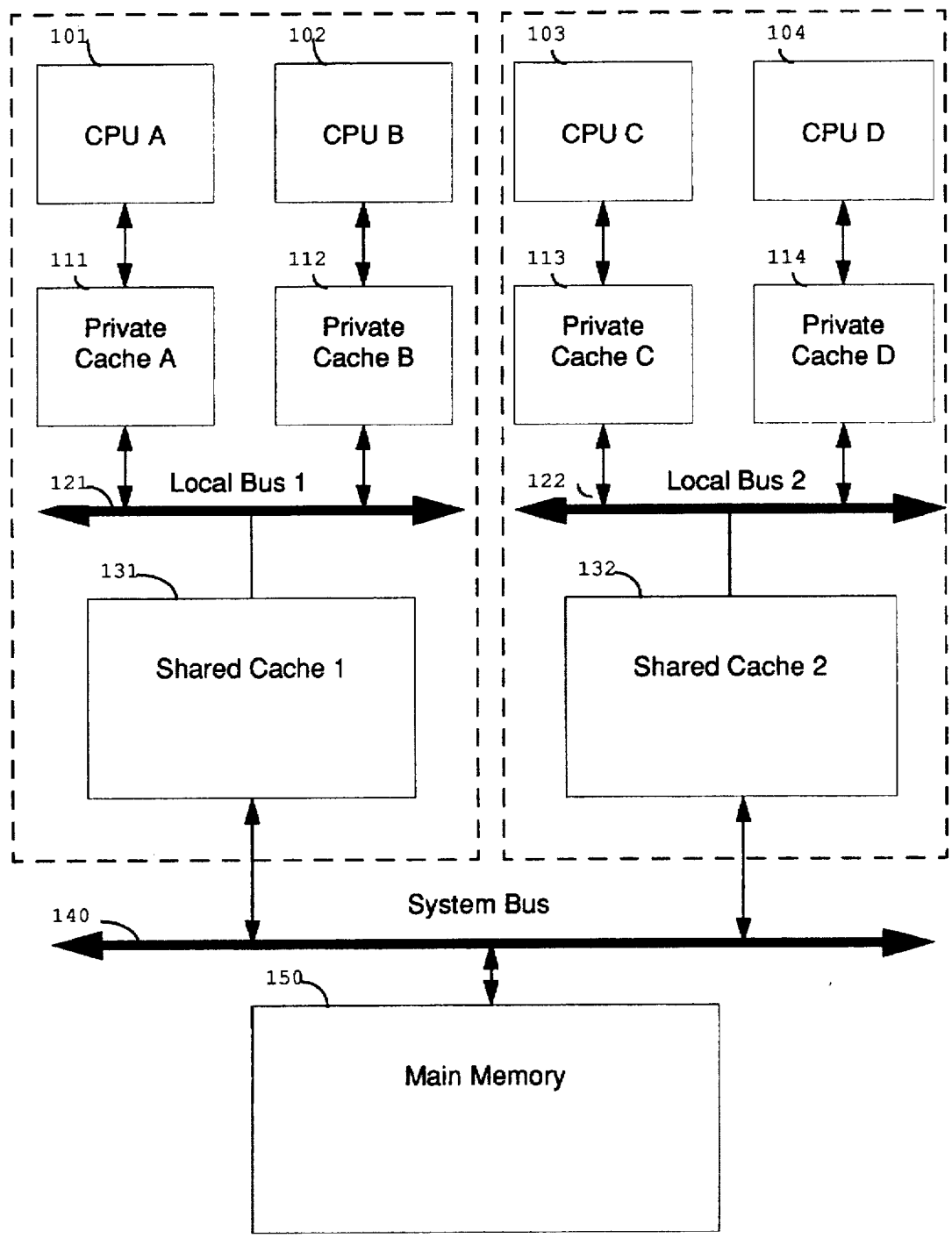
FIG. 1 Block diagram of a typical multi-processor system.
Figure 3:
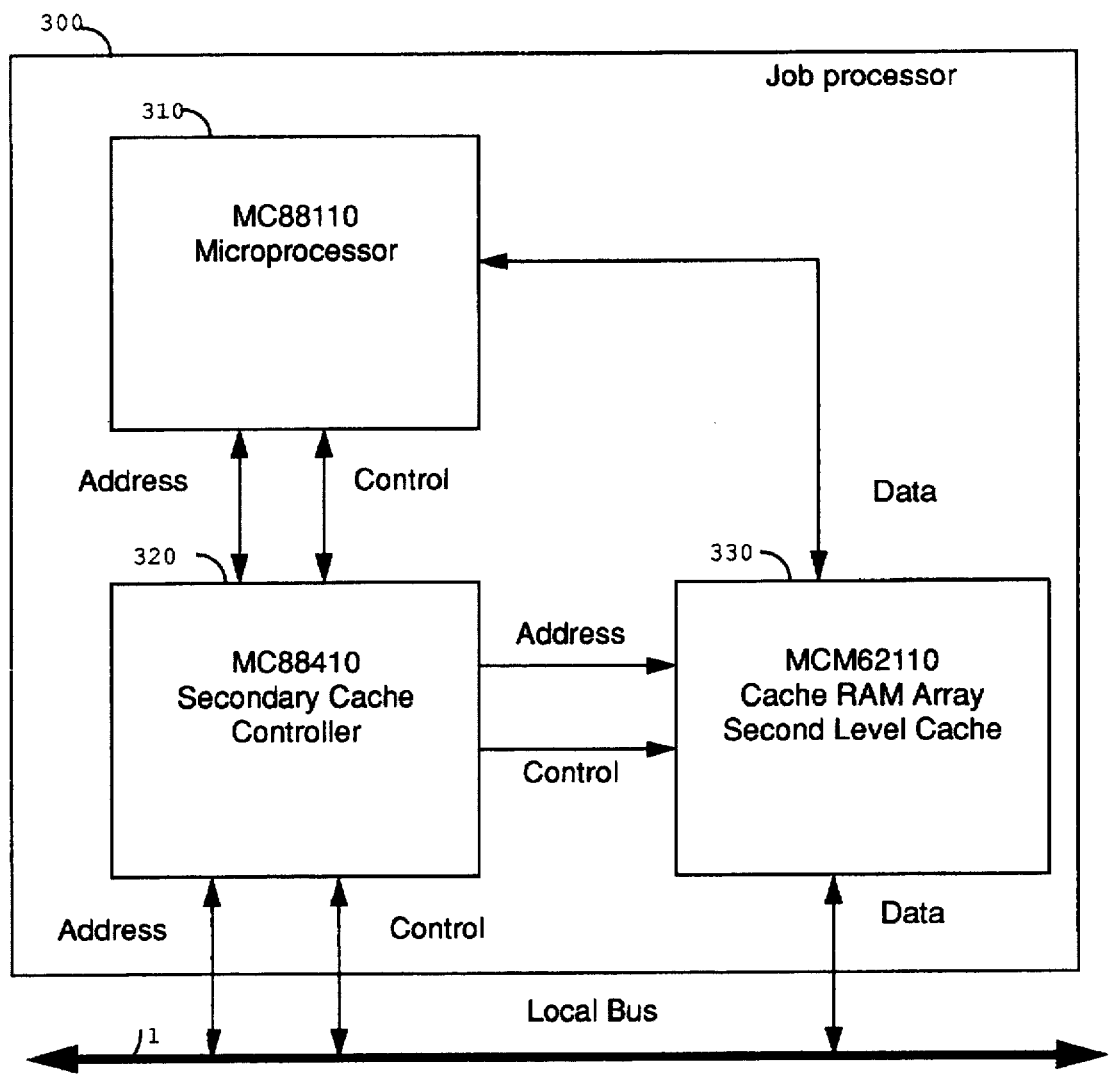
FIG. 3 A Job Processor (JP) in the preferred embodiment

FIG. 3 shows one Job Processor (JP) 300. Each JP comprises an MC88110 Microprocessor 310, an MC88410 Secondary Cache Controller 320 and an array of MCM62110 Cache RAMs. The MC88110 Microprocessor 310 has 16K bytes of on chip first level cache. If an instruction or data word is not found in the first level cache, a request is made to the MC88410 320 to look in second level cache 330. If the requested item is found in the second level cache it is returned to the MC88110 310. If the requested item is not found in second level cache 330 a request is made on the local bus 1.

Figure 4:
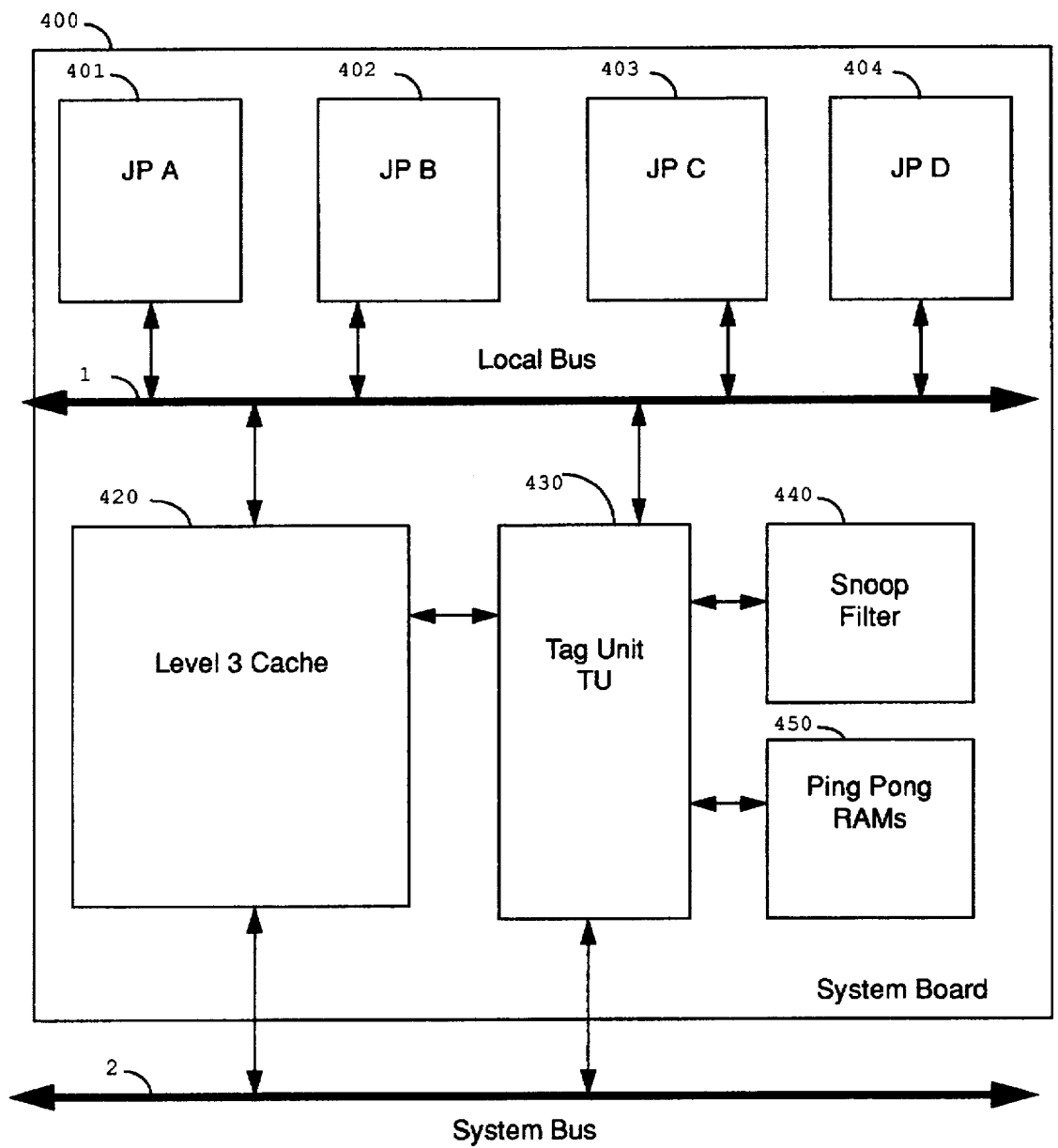
FIG. 4 A System Board in the preferred embodiment

FIG. 4 shows a System Board. The system board contains four JPs 401, 402, 403 and 404 connected to the local bus 1. Each JP to 404 is identical to JP 300 shown in FIG. 3. There is also a level 3 cache 420 connected to the local bus 1. A Tag Unit (TU) 430 is also connected to the local bus 1. The Tag Unit 430 is also connected to the third level cache 420.

In addition to the third level cache 420, the TU has two additional sets of RAMS associated with it. The Snoop Filter RAMs 440 contain a copy of the cache state of each cache line in each of the MC88410s 320 on system board 400. The ping-pong RAMs 450 are used to reduce bus traffic as described below. The level 3 cache 420 and the TU are also connected to the system bus 2. The snoop filter RAMs 440 and the ping pong RAMS 450 may be combined in a single RAM or set of RAMs. They are shown as distinct blocks to make the description clearer.

Figure 5:
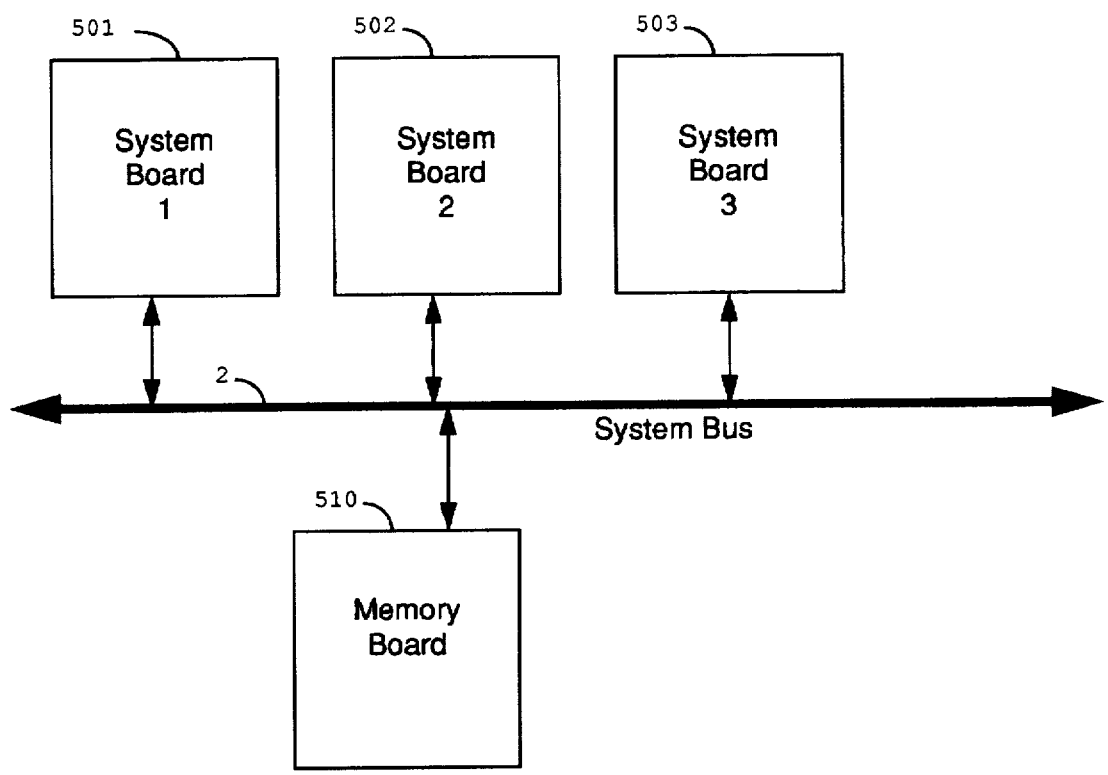
FIG. 5 A configuration of the preferred embodiment with 12 CPUs

FIG. 5 shows a twelve JP configuration. There are three system boards 501, 502 and 503 each having four JPs. The system boards are each connected to the system bus 2. A memory board 510 is also connected to the system bus 2.

In the configuration shown in FIG. 5 there are 12 MC88410 Secondary Cache Controllers each of which must monitor (or snoop) its associated local bus to maintain cache coherency. See "MC88410 Secondary Cache Controller User's Manual" pages 2–41 through 2–72 and incorporated here by reference for a description of the bus snooping protocol.

The Tag Control Unit 430 has two primary functions:

a) To maintain coherency for the third level cache 420; and b) to provide filtering of addresses between its associated local bus 1 and the system bus 2.

Both the third level cache 420 and the filtering are designed to reduce the amount of traffic that must go from one bus to the other, to help improve the performance of the system. The operation of the third level cache is conventional and need not be describe further here with one exception:

There is a Remote Shared (RS) bit associated with each line in third level cache 420. The RS bit is used to indicate if a line in the third level cache is shared by another system board. If the RS bit is true, then another board may or may not have the line shared. If the RS bit is false, then no other board has the line. The bit is used to determine if an invalidate or read-intent-to-modify request from the local bus 1 needs to go to the system bus 2. If the invalidate or read-intent-to-modify request hits a valid line in the third level cache 420, and the RS bit is false, then the request does not need to go to the system bus 2. In this case, the third level cache 420 is marked invalid.

There is an existing signal on the system bus 2 called SHARED. The SHARED signal is generated by the TU 430 on the remote system board. The TU 430 on the local system board uses this signal is used to control the RS bit. For example, if system board 1 501 in FIG. 5 is doing a read and the data is coming from system board 2 502 then the TU 430 on system board 2 generates the SHARED signal and it is received by the TU 430 on system board 1 501. The RS bit is set to the false state if a local (i.e., on the same system board) MC88410 issues a read (not intent-to-modify) that misses the third level cache 420, and the SHARED signal is not asserted on the system bus 2. The RS bit is set to the true state if a local MC88410 issues a read (not intent-to-modify) that misses the third level cache 420 and the SHARED signal is asserted on the system bus 2. Each system board monitors the system bus 2 and will assert SHARED if the system board has a copy of the requested information. The RS bit is also set to the true state if there is a read (not-intent-to-modify) on the system bus 2 and the address hits the third level cache 420 of another board.

The present invention is designed to reduce the number of bus cycles used on the system bus 2 when there is a location in main memory 510 that is being updated (read then modified) by multiple JPs on different system boards (501, 502, 503). The modified line must be passed from one JP to another so that only one copy of the information is ever in the Exclusive-Modified state. In this example, assume a JP on system board 1 501 needs a data item and a JP on system board 3 503 has that data item in the Exclusive-Modified state. The data item must be copied from system board 3 503 to system board 1 501 resulting in the data item being shared. In the prior art system, the following steps are required:

1. The JP on system board 1 501 reads the line from system board 3 503. The line is also written to main memory 510. The cache state for the line on system board 1 is set to Shared-Unmodified. The cache state for the line on system board 3 503 goes from Exclusive-Modified to Shared-Unmodified.

2. The JP on system board 1 501 (later on) needs to update the line so it sends out an invalidate command on the system bus 2. This causes the JP on system board 3 503 to change its cache state for the line to Invalid. The JP on system board 1 501 can now change the cache state for the line to Exclusive-Modified.

3. The JP on system board 3 503 reads the line from system board 1 501. The line is also written to main memory 510. The cache state for the line on system board 3 is set to Shared-Unmodified. The cache state for the line on system board 1 501 goes from Exclusive-Modified to Shared-Unmodified.

4. The JP on system board 3 503 needs to update the line so it sends out an invalidate command on the system bus 2. This causes the JP on system board 1 501 to change its cache state for the line to Invalid. The JP on system board 3 503 can now change the cache state for the line to Exclusive-Modified.

5. The JP on system board 1 501 reads the line from system board 3 503. The line is also written to main memory 510. The cache state for the line on system board 1 is set to Shared-Unmodified. The cache state for the line on system board 3 503 goes from Exclusive-Modified to Shared-Unmodified.

6. The JP on system board 1 501 needs to update the line so it sends out an invalidate command on the system bus 2. This causes the JP on system board 3 503 to change its cache state for the line to Invalid. The JP on system board 1 501 can now change the cache state for the line to Exclusive-Modified.

The above sequence of steps 3 to 6 can repeat several times. For each sequence there is a transition for Exclusive-Modified to Shared-Unmodified followed by an invalidate cycle to change the cache state to Invalid. The present invention eliminates the extraneous invalidate cycle:

1. The JP on system board 1 501 reads the line from system board 3 503. The line is also written to main memory 510. The cache state for the line on system board 1 is set to Shared-Unmodified. The TU 430 on system board 1 501 sets the ping-pong bit corresponding to the cache line to true. The cache state for the line on system board 3 503 goes from Exclusive-Modified to Shared-Unmodified.

2. The JP on system board 1 501 needs to update the line so it sends out an invalidate command on the system bus 2. This causes the JP on system board 3 503 to change its cache state for the line to Invalid. The JP on system board 1 501 can now change the cache state for the line to Exclusive-Modified. The ping-pong bit on system board 1 501 remains in the true state.

3. The JP on system board 3 503 reads the line from system board 1 501 and marks the line as Exclusive-Unmodified. The line is also written to main memory 510. Since the ping-pong bit is set on system board 1 501 that board will not assert SHARED on system bus 2 and the cache state is changed from Exclusive-Modified to Invalid. The cache line is not placed in the Shared-Unmodified state and thus system board 3 503 does not need to issue an invalidate cycle on the system bus 2. Since SHARED is not asserted on system bus 2, system board 3 503 stores the line in the Exclusive-Unmodified state and can update it without any additional cycles on the system bus 2. The ping-pong bit for the line on system board 1 501 is set to the false state and the ping-pong bit on system board 3 503 is set to the true state. 4. The JP on system board 1 501 reads the line from system board 3 503 and marks the line Exclusive-Unmodlfied. The line is also written to main memory 510. The cache state for the line on system board 3 503 goes from Exclusive-Modified to Invalid. System board 1 501 already has the line as Exclusive-Unmodified and can update it without any additional cycles on the system bus 2. The ping-pong bit for the line on system board 1 501 is set to the true state and the ping-pong bit for the line on system board 3 503 is set to the false state.

The ping-pong bit allows step 3 and 4 to repeat with the modified line being passed back and forth several times. Each time this happens there is one fewer operation on the local bus 1 of each system board and on the system bus 2.

In order to set the ping-pong bit for a given cache line, the TU 430 needs several pieces of information. The means for obtaining this information are well known to those skilled in the art:

1. Did the request come from the a JP on this system board or a JP on some other system board? If the request came from this board then it is called a local master. If the request came from some other board it is called a remote master.

2. What is the status of the level 3 (L3) cache and the Remote Shared (RS) bit?

3. Did the request go out on (or come in from) the system bus 27?

4. Did the information come from main memory or from another system board? There is a signal on the system bus 2 called INTERVENE. When another system board has the required information it generates the INTERVENE signal on system bus 2. If the required information is coming from main memory 510 then INTERVENE is false. When INTERVENE is true the information came from another system board. When INTERVENE is false, the information came from main memory 510.

5. What is the current status of the ping-pong bit? Because the ping-pong bit is associated with a level 2 cache line, it will only be true if there is a hit in the level 2 cache.

Given the information above, the state of the ping-pong bit for a cache line is given by the following table:

| BUS CYCLE | MASTER | L3 CACHE | SYSTEM BUS | INTERVENE | PREVIOUS PING-PONG | NEXT PING-PONG |
|---|---|---|---|---|---|---|
| Read | local | miss | yes | False | do not care | False |
| Read | local | miss | yes | True | do not care | True |
| Read | local | hit | no | do not care | do not care | False |
| Read-intent-to-modify | local | miss | yes | do not care | do not care | True |
| Read-intent-to-modify | local | hit and not RS | no | do not care | do not care | True |
| Read-intent-to-modify | local | hit and RS | yes | do not care | do not care | True |
| Invalidate | local | miss | yes | do not care | do not care | True |
| Invalidate | local | hit and not RS | no | do not care | do not care | True |
| Invalidate | local | hit and RS | yes | do not care | do not care | True |
| Read | remote | do not | yes | do not care | True | False* |
| Read-intent-to-modify | remote | do not | yes | do not care | True | False* |
| Invalidate | remote | do not | yes | do not care | True | False* |

"*False" in the Next Ping-Pong column means that in addition to setting the ping-pong bit to the false state, the level 1, level 2 and level 3 cache tags will be set-to the Invalid state on that system board.

CONCLUSIONS, RAMIFICATIONS, AND SCOPE

Although the description above contains many specificities, these should not be construed as limiting the scope of the invention but as merely providing illustrations of some of the presently preferred embodiments of this invention. Various other embodiments and ramifications are possible within its scope.

Thus the scope of the invention should be determined by the appended claims and their legal equivalents, rather than by the examples given.

What is claimed is:

1. A cache memory control system for use with a plurality of Job Processors (JPs), said system comprising:
   (a) a main memory for storing a plurality of instructions and operands at addressable locations;
   (b) a plurality of JPs each having a private cache capable of storing information from said memory each private cache having a plurality of cache lines each of which may be in either an invalid, or at least one valid state;
   (c) a plurality of ping-pong bits one bit associated with each said cache line of each said plurality of JPs;
   (d) a tag unit connected to said plurality of JPs and said plurality of ping-pong bits;
   (e) a system bus connected to said tag unit;
   (f) if said system bus accesses said tag unit and if the ping-pong bit associated with the cache line being accessed by said tag unit is true then the cache line associated with said ping-pong bit will be set to said invalid state.

2. The cache memory control system according to claim 1 wherein said tag unit further includes setting said associated ping-pong bit to the false state.

3. The cache memory control system according to claim 1, also comprising an additional cache connected to each of said JPs.

4. The cache memory control system according to claim 3, also comprising:
   (a) a plurality of remote shared (RS) bits, one RS bit associated with each said cache line of said additional cache;
   (b) said system bus also having a SHARED signal used to control said RS bit;
   (c) said SHARED signal connected to said tag unit;
   (d) said tag unit setting said RS bit to the false state if one of said plurality of JPs issues a read that misses said additional cache and said SHARED signal is not asserted on said system bus;
   (e) said tag unit setting said RS bit to the true state if one of said plurality of said JPs issues a read that misses said additional cache and said shared signal is not asserted on said system bus.

5. The cache memory control system according to claim 4 wherein said tag unit sets said RS bit to the true state if there is a read without intent-to-modify on said system bus and said read hits on said additional cache.

6. The cache memory control system according to claim 5, wherein said system bus also includes an INTERVENE signal connected to said tag unit.

7. The cache memory control system according to claim 6, wherein said tag unit sets said associated ping-pong bit to the false state when one of said plurality of JPs issues a read request which misses said additional cache and said INTERVENE signal is not asserted.

8. The cache memory control system according to claim 6, wherein said tag unit sets said associated ping-pong bit to the true state when one of said plurality of JPs issues a read request which misses said additional cache and said INTERVENE signal is asserted.

9. The cache memory control system according to claim 5, wherein said tag unit sets said associated ping-pong bit to the false state when one of said plurality of JPs issues a read request which hits said additional cache.

10. The cache memory control system according to claim 5, wherein said tag unit sets said associated ping-pong bit to the true state when one of said plurality of JPs issues a read request with intent to modify which misses said additional cache.

11. The cache memory control system according to claim 5, wherein said tag unit sets said associated ping-pong bit to the true state when one of said plurality of JPs issues a read request with intent to modify which hits said additional cache and said associated RS bit is true.

12. The cache memory control system according to claim 5, wherein said tag unit sets said associated ping-pong bit to the true state when there is an invalidate cycle on said system bus which misses said additional cache.

13. The cache memory control system according to claim 5, wherein said tag unit sets said associated ping-pong bit to the true state when there is an invalidate cycle on said system bus which hits said additional cache and said associated RS bit is true.

14. The cache memory control system according to claim 1, wherein said tag unit is external to said JP.

15. In a data processing system having a main memory; a plurality of job processors (JPs), each JP having a microprocessor and a first cache memory; a system bus; a plurality of local buses, each local bus being connected to a subset of the JPs; a plurality of shared cache memories, each shared cache memory being connected to the system bus and one of the local buses; and a plurality of tag units, each tag unit being connected to the system bus, one of the local buses and one of the shared cache memories, comprising:

(a) in each shared cache memory, maintaining information associated with each data entry in at least a portion of that shared cache memory indicating whether that data entry is identified as a candidate for transfer to another shared cache memory, and (b) if a data entry is transferred from a first shared cache memory to a second shared cache memory and the information stored in the first shared cache memory associated with the transferred data entry indicates that data entry was identified as a candidate for transfer to another shared cache memory, invalidating the transferred cache entry in the first shared cache memory.

16. The method of claim 15 wherein step b) comprises the additional step of invalidating all copies of the transferred cache entry in all JPs connected to the first shared cache memory.

17. In a data processing system having a main memory; a plurality of job processors (JPs), each JP having a microprocessor and a first cache memory; a system bus; a plurality of local buses, each local bus being connected to a subset of the JPs; a plurality of shared cache memories, each shared cache memory being connected to the system bus and one of the local buses; and a plurality of tag units, each tag unit being connected to the system bus, one of the local buses and one of the shared cache memories, a plurality of ping pong bits connected to each said tag unit, a method for controlling the state of the ping pong bits connected to one of said tag units in response to a "read not intent to modify request" received by a first shared cache memory, the method comprising:

(a) if the read request originated from one of the JPs connected to the first shared cache memory and the requested cache entry is not located in the first shared cache memory and the requested cache entry is received from a second shared cache memory, setting the ping pong bit associated with the received cache entry in the first shared cache memory to a first state, (b) if the read request originated from one of the JPs connected to the first shared cache memory and the requested cache entry is not located in the first shared cache memory and the requested cache entry is received from the main memory, setting the ping pong bit associated with the received cache entry in the first shared cache memory to a second state, (c) if the read request originated from one of the JPs connected to the first shared cache memory and the requested cache entry is located in the first shared cache memory, setting the ping pong bit associated with the received cache entry in the first shared cache memory to a second state, and (d) if the read request originated from a JP connected to a second shared cache memory and the cache entry is located in the first shared cache memory and the ping pong bit associated with the requested cache entry is in the first state, setting the ping pong bit to the second state.

18. In a data processing system having a main memory; a plurality of job processors (JPs), each JP having a microprocessor and a cache memory; and a system bus, the method of controlling data transfer operations among the JPs comprising the steps of:

(a) in each cache memory of each JP, maintaining information associated with each data entry in at least a portion of that cache memory indicating whether that data entry is identified as a candidate for transfer over the system bus to a different JP; and (b) if a data entry is transferred from a first JP to a second JP over the system bus and the information maintained in step (a) associated with the transferred data entry indicates that that data entry was identified as a candidate for transfer over the system bus, invalidating the transferred cache entry in the cache memory of the first JP.

19. In a data processing system having a main memory; a plurality of job processors (JPs), each JP having a microprocessor and a cache memory, each said cache memory having a plurality of ping pong bits associated therewith, each said ping pong bit being associated with a individual cache entry in the cache memory with which the ping pong bit is associated; a method for controlling the state of the ping pong bits in response to a cache entry access request from a first JP, the method comprising the steps of:

(a) if the requested cache entry is received over the system bus from a second JP,
        (i) setting the ping pong bit associated with the requested cache entry in said first JP to a first state, and
        (ii) if the ping pong bit associated with the requested cache entry in said second JP is in the first state, setting said ping pong bit in said second JP to a second state; and (b) if the requested cache entry is received from the main memory, setting the ping pong bit associated with the received cache entry in said first JP to a second state.

20. The method of claim 19 further comprising the additional step of:

(c) if the requested cache entry is received from another JP other than over the system bus, setting the ping pong bit associated with the received cache entry in said first JP to a second state.

\* \* \* \* \*